(12) United States Patent
Young et al.

(10) Patent No.: US 6,665,651 B2
(45) Date of Patent: Dec. 16, 2003

(54) CONTROL SYSTEM AND TECHNIQUE EMPLOYING REINFORCEMENT LEARNING HAVING STABILITY AND LEARNING PHASES

(75) Inventors: Peter M. Young, Fort Collins, CO (US); Charles Anderson, Fort Colins, CO (US); Douglas C. Hittle, Fort Collins, CO (US); Matthew Kretchmar, Newark, OH (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 10/197,731

(22) Filed: Jul. 18, 2002

(65) Prior Publication Data

US 2003/0074338 A1 Apr. 17, 2003

Related U.S. Application Data

(60) Provisional application No. 60/306,380, filed on Jul. 18, 2001.

(51) Int. Cl.$^7$ .............................. G06F 15/18; G06G 7/00
(52) U.S. Cl. ............................... 706/21; 706/16; 706/39
(58) Field of Search ............................... 706/21, 16, 39

(56) References Cited

U.S. PATENT DOCUMENTS

| | | | | |
|---|---|---|---|---|
| 5,212,765 A | 5/1993 | Skeirik | .......................... | 395/11 |
| 5,282,261 A | 1/1994 | Skeirik | .......................... | 395/22 |
| 5,448,681 A | 9/1995 | Khan | .......................... | 395/11 |
| 5,720,002 A | 2/1998 | Wang | .......................... | 395/21 |
| 5,781,701 A | 7/1998 | Wang | .......................... | 395/24 |
| 5,870,729 A | 2/1999 | Yoda | .......................... | 706/26 |

OTHER PUBLICATIONS

S. Jagannathan, "Adaptive Critic Neural Network—Based Controller for Nonlinear Systems", Proceedings of International Symposium on Intelligent Control, Oct. 2002.*

Anderson, C. W., Hittle, D., Katz, A. and Kretchmar, R., *Synthesis of Reinforcement Learning, Neural Networks, and PI Control Applied to a Simulated Heating Coil*. Journal of Artificial Intelligence in Engineering, vol. 11, #4, pp. 423–431, 1997.

Kretchmar, R. M.., and Anderson, C. W., *Using Temporal Neighborhoods to Adapt Function Approximators in Reinforcement Learning*. In Proceedings of International Work–Conference on Artificial and Natural Neural Networks, Jun. 2–4, Alicante, Spain, Springer–Verlag, 1999.

Anderson, C. W., Hittle, D., Katz, A. and Kretchmar, R. *Reinforcement Learning, Neural Networks and PI Control Applied to a Heating Coil*. Solving Engineering Problems with Neural Networks: Proceedings of the International Conference on Engineering Applications of Neural Networks (EANN–96), ed. by Bulsari, A.B., Kallio, S., and Tsaptsinos, D., Systems Engineering Association, PL 34, FIN–20111 Turki 11, Finland, pp. 135–142, 1996.

(List continued on next page.)

*Primary Examiner*—George B. Davis
(74) *Attorney, Agent, or Firm*—Macheledt Bales LLP

(57) ABSTRACT

A feedback control system for automatic on-line training of a controller for a plant, the system having a reinforcement learning agent connected in parallel with the controller. The learning agent comprises an actor network and a critic network operatively arranged to carry out at least one sequence of a stability phase followed by a learning phase. During the stability phase, a multi-dimensional boundary of values is determined. During the learning phase, a plurality of updated weight values is generated in connection with the on-line training, if and until one of the updated weight values reaches the boundary, at which time a next sequence is carried out to determine a next multi-dimensional boundary of values followed by a next learning phase. Also, a method for automatic on-line training of a feedback controller within a system comprising the controller and a plant by employing a reinforcement learning agent comprising a neural network to carry out at least one sequence comprising a stability phase followed by a learning phase. Further included, a computer executable program code on a computer readable storage medium, for on-line training of a feedback controller within a system comprising the controller and a plant.

20 Claims, 6 Drawing Sheets

OTHER PUBLICATIONS

Anderson, C. W., et al, "*Synthesis of Reinforcement Learning, Neural Networks, and PI Control Applied to a Simulated Heating Coil.*" circa 1995; earlier version of 1$^{st}$ above–listed ref. (1997); labeled ATTACHMENT E of priority provisional appl'n 06/306,380 filed Jul. 18, 2001.

PCT International Application WO 93/23822 from PCT/US93/04364 (filed May 13, 1993, International publication date Nov. 25, 1993, applicant Alkon, et al.).

Crites, R.H., and A. G. Barto, "*Improving Elevator Performance Using Reinforcement Learning*", Touretzky,et al. eds., Advances in Neural Information Processing Systems 8. MIT Press, Cambridge MA, 1996.

Singh, S., and Dimitri Bertsekas, "*Reinforcement Learning for Dynamic Channel Allocation in Cellular Telephone Systems*".

Anderson, C. W., and W. T. Miller, "*Challenging Control Problems,*" MIT Press text appendix, pp. 474–509, 1990.

* cited by examiner

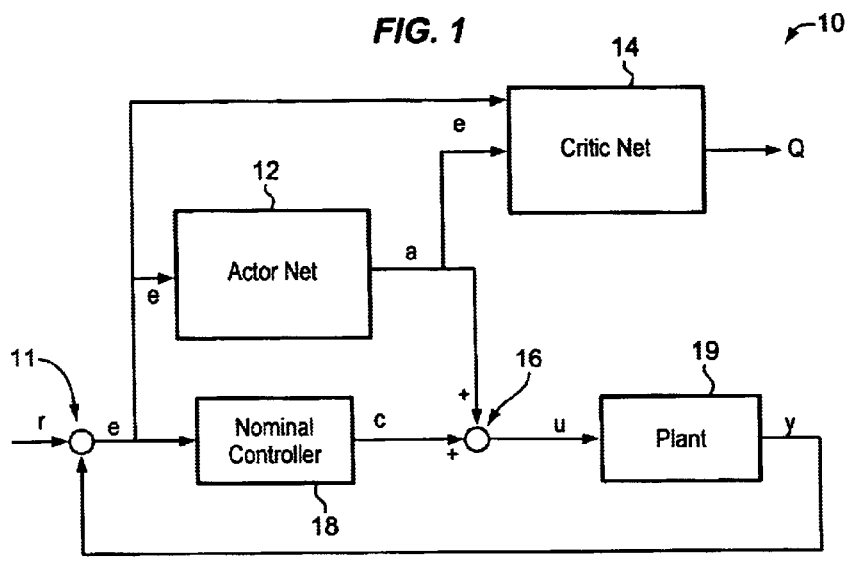
FIG. 1
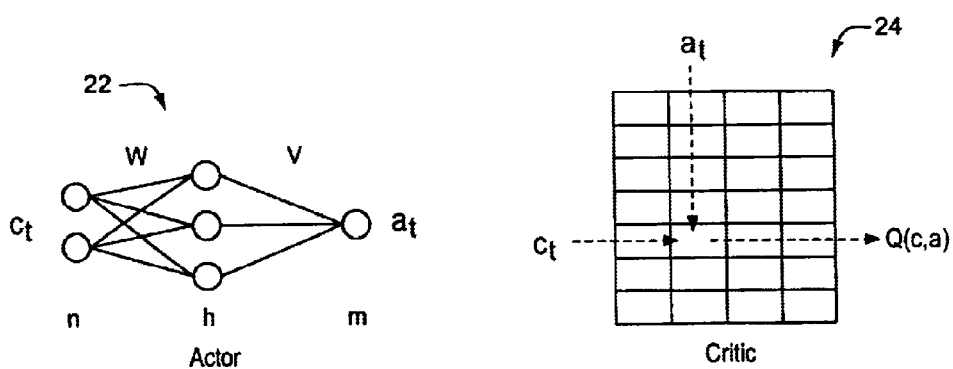
FIG. 2A　　　　FIG. 2B

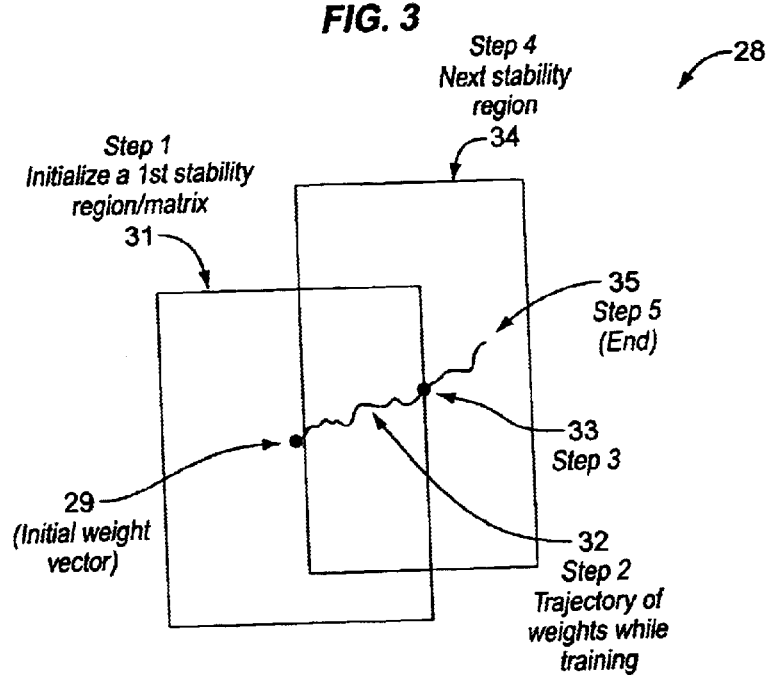
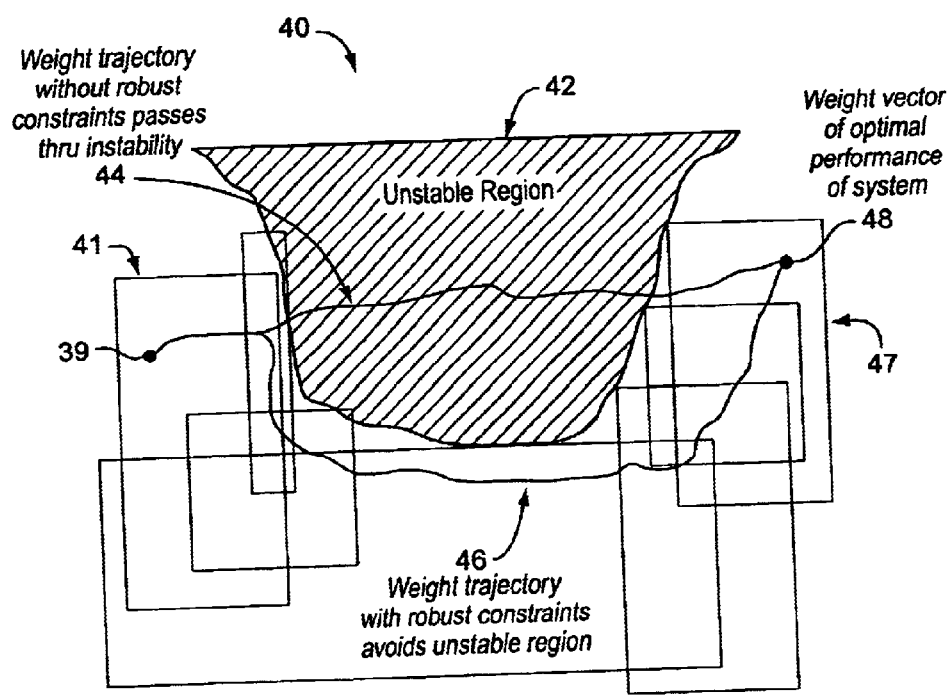

CONTROL SYSTEM AND TECHNIQUE EMPLOYING REINFORCEMENT LEARNING HAVING STABILITY AND LEARNING PHASES

This application claims priority to pending U.S. provisional patent application filed by the assignee hereof, No. 60/306,380, on Jul. 18, 2001.

The invention disclosed herein was made with United States government support awarded by the National Science Foundation, under contract numbers CMS-9804757 and 9732986. Accordingly, the U.S. Government has certain rights in this invention.

BACKGROUND OF THE INVENTION

In general, the present invention relates to techniques for training neural networks employed in control systems for improved controller performance. More-particularly, the invention relates to a new feedback control system and associated method employing reinforcement learning with robust constraints for on-line training of at least one feedback controller connected in parallel with a novel reinforcement learning agent (sometimes referred to, herein, as "RL agent"). Unlike any prior attempt to apply reinforcement learning techniques to on-line control problems, the invention utilizes robust constraints along with reinforcement learning components, allowing for on-line training thereof, to augment the output of a feedback controller in operation-allowing for continual improved operation-moving toward optimal performance while effectively avoiding system instability. The system of the invention carries out at least one sequence of a stability phase followed by a learning phase. The stability phase includes the determination of a multi-dimensional boundary of values, or stability range, for which learning can take place while maintaining system stability. The learning phase comprises the generating a plurality of updated weight values in connection with the on-line training; if and until one of the updated weight values reaches the boundary, a next sequence is carried out comprising determining a next multi-dimensional boundary of values followed by a next learning phase. A multitude of sequences may take place during on-line training, each sequence marked by the calculation of a new boundary of values within which RL agent training, by way of an updating of neural network parameter values, is permitted to take place.

Use of conventional reinforcement learning alone (whether comprising a neural network), to optimize performance of a controller nearly guarantees system instability at some point, dictating that off-line training of sufficient duration must be done, initially, with either simulated or real data sets. Furthermore, while the use of robust control theory, without more, provides a very high level of confidence in system stability, this level of stability is gained at a cost: System control is much less aggressive. Such conservative operation of a feedback control system will rarely reach optimal performance.

Two key research trends led to the early development of reinforcement learning (RL): trial and error learning from psychology disciplines and traditional "dynamic programming" methods from mathematics. RL began as a means for approximating the latter. Conventional RL networks interact with an environment by observing states, s, and selecting actions, a. After each moment of interaction (observing s and choosing an a), the network receives a feedback signal, or reinforcement signal, R, from the environment. This is much like the trial-and-error approach from animal learning and psychology. The goal of reinforcement learning is to devise a control algorithm, often referred to as a policy, that selects optimal actions for each observed state. Here according to the instant invention, optimal actions includes those which produce the highest reinforcements not only for the immediate action, but also for future states and actions not yet selected: the goal being improved overall performance. It is important to note that reinforcement learning is not limited to neural networks; the function and goal(s) of RL can be carried out by any function approximator, such as a polynomial, or a table may be used rather than a neural network, and so on.

In earlier work of the applicants, Anderson, C. W., et al, "Synthesis of Reinforcement Learning, Neural Networks, and PI Control Applied to a Simulated Heating Coil." Journal of Artificial Intelligence in Engineering, Vol. 11, #4 pp. 423–431 (1997) and Anderson, C. W., et al, "Reinforcement Learning, Neural Networks and PI Control Applied to a Heating Coil." Solving Engineering Problems with Neural Networks: proceedings of the International Conference on Engineering Applicatoins of Neural Networks (EANN-96), ed. By Bulsari, A. B. et al. Systems Engineering Association, Turku, Finland, pp. 135–142 (1996), experimentation was performed on the system as configured in FIG. 8 of the latter (1997) of the above two references. In this prior work, applicants trained the reinforcement learning agent off-line for many repetitions, called trials, of a selected number of time-step interactions between a simulated heating coil and the combination of a reinforcement learning tool and the PI controller, to gather data set(s) for augmenting (by direct addition, at C) the output of the PI Controller during periods of actual use to control the heating coil. In this 1997 prior work, applicants define and applied a simple Q-learning type algorithm to implement the reinforcement learning.

In their pursuit to continue to analyze and characterize on-line training of a neural network connected to a feedback controller, it was not until later that the applicants identified and applied the unique technique of the instant invention employing a two phase technique, thus allowing for successful on-the-fly, real-time, training of a reinforcement learning agent in connection with a feedback controller, while ensuring stability of the system during the period of training. Conventionally, reinforcement learning had been applied to find solutions to control problems by learning good approximations to the optimal value function, J*, given by the solution to the Bellman optimality equation which can take the form identified as Eqn. (1) in Singh, S., et al, "Reinforcement Learning for Dynamic Channel Allocation in Cellular Telephone Systems." (undated). And as mentioned earlier, when conventional RL is placed within a feedback control framework, it must be trained off-line in a manner that exposes the system to a wide variety of commands and disturbance signals, in order to become 'experienced'. This takes a great deal of time and extra expense.

The conventional techniques used to train neural networks off-line can become quite costly: Not only are resources spent in connection with off-line training time, but additional resources are spent when employing feedback controllers operating under conservative, less-aggressive control parameters. For instance, US Pat. No. 5,448,681 issued Sep. 5, 1995 to E. E. R. Khan, refers to what it identifies as a conventional reinforcement learning based system shown in Khan's FIG. 1. A closer look at Khan '681 reveals that no suggestion of stability is made. Khan does not attempt to control an interconnected controller on-line with its reinforcement learning subsystem (FIG. 1). Further, Khan simply doesn't recognize or suggest any need for a stability analysis. Here, the conventional Khan system has to learn everything from scratch, off-line.

While there have been other earlier attempts at applying conventional notions of reinforcement learning to particular control problems, until applicants devised the instant invention, the stability of a feedback control system into which conventional reinforcement learning was incorporated for on-line learning, simply could not be guaranteed. But rather, one could expect that this type of conventional feedback control system, training itself on-the-fly, will pass through a state of instability in moving toward optimal system performance (see FIG. 4 hereof, particularly the path of weight trajectory 44 without application of constraints according to the invention). While academic study of conventional systems is interesting to note, in practice, these systems are not so interesting to an operators: It will crash before reaching an optimal state. Whereas, a control system employing the robust constraints of the two phased technique of the instant invention, will not—as one will better appreciate by tracing the lower weight trajectory 46 plotted in FIG. 4, representing that of a system operating according to the instant invention.

SUMMARY OF THE INVENTION

It is a primary object of the invention to provide a feedback control system for automatic on-line training of a controller for a plant to reach a generally optimal performance while maintaining stability of the control system. The system has a reinforcement learning agent connected in parallel with the controller. As can be appreciated, the innovative system and method employ a learning agent comprising an actor network and a critic network operatively arranged to carry out at least one sequence of a stability phase followed by a learning phase, as contemplated and described herein. The system and method can accommodate a wide variety of feedback controllers controlling a wide variety of plant features, structures and architectures—all within the spirit and scope of design goals contemplated hereby. Advantages of providing the new system and associated method, include without limitation:

(a) System versatility;
(b) Simplicity of operation-automatic, unmanned long term operation;
(c) Speed with which an optimal state of system control may be reached; and
(d) System design flexibility.

Briefly described, once again, the invention includes a feedback control system for automatic on-line training of a controller for a plant. The system has a reinforcement learning agent connected in parallel with the controller. The learning agent comprises an actor network and a critic network operatively arranged to carry out at least one sequence of a stability phase followed by a learning phase. During the stability phase, a multi-dimensional boundary of values is determined. During the learning phase, a plurality of updated weight values is generated in connection with the on-line training, if and until one of the updated weight values reaches the boundary, at which time a next sequence is carried out to determine a next multi-dimensional boundary of values followed by a next learning phase.

In a second characterization, the invention includes a method for automatic on-line training of a feedback controller within a system comprising the controller and a plant by employing a reinforcement learning agent comprising a neural network to carry out at least one sequence comprising a stability phase followed by a learning phase. The stability phase comprises the step of determining a multi-dimensional boundary of neural network weight values for which the system's stability can be maintained. The learning phase comprises the step of generating a plurality of updated weight values in connection with the on-line training; and if, during the learning phase, one of the updated weight values reaches the boundary, carrying out a next sequence comprising the step of determining a next multi-dimensional boundary of weight values followed by a next learning phase.

In a third characterization, the invention includes a computer executable program code on a computer readable storage medium, for on-line training of a feedback controller within a system comprising the controller and a plant. The program code comprises: a first program sub-code for initializing input and output weight values, respectively, $W_I$ and $V_I$, of a neural network; a second program sub-code for instructing a reinforcement agent, comprising the neural network and a critic network, operatively arranged in parallel with the controller, to carry out a stability phase comprising determining a multi-dimensional boundary of neural network weight values for which the system's stability can be maintained; and a third program sub-code for instructing the reinforcement agent to carry out a learning phase comprising generating a plurality of updated weight values in connection with the on-line training if and until any one of the updated weight values reaches the boundary, then instructing the reinforcement agent to carry out a next sequence comprising determining a next multi-dimensional boundary of weight values followed by a next learning phase. The first program sub-code can further comprise instructions for setting a plurality of table look-up entries of the critic network, to zero; and the third program sub-code can further comprise instructions for reading into a memory associated with the neural network, a state variable, s, to produce a control signal output, a, and reading into a memory associated with the critic network, a state and action pair to produce a value function, Q(s, a). The program code can further comprise instructions for exiting any of the learning phases for which a total number of the updated weight values generated, reaches a preselected value.

There are many further distinguishing features of the control system and method of the invention. The actor network preferably includes a neural network such as a feed-forward, two-layer network parameterized by input and output weight values, respectively, W and V. Input into the neural network is at least one state variable, s, such as a tracking error, e, along with one or more other state variables of the controller. The critic network can include a table look-up mechanism, or other suitable function approximator, into which a state and action pair/vector are input to produce a value function therefor. The critic network is preferably not interconnected as a direct part of the control system feedback loop. The state and action pair can include any such state, s, and a control signal output from the actor network, a, to produce, accordingly, the value function, Q(s, a). The multi-dimensional boundary of values is preferably a stability range which can be defined by perturbation weight matrices, dW and dV, in the two-dimensional case, and up to any number of perturbation matrices, thus creating a higher-dimensional stability space, depending on neural network parameterization characteristics.

Input and output weight values, respectively, W and V, of the neural network can be initialized by randomly selecting small numbers such as, for example, selecting numbers from a Gaussian distribution having a mean equal to zero and some small variance such as 0.1. Input and output output weight values for any current step t, can be designated respectively, $W_t$ and $V_t$. The control signal output from the actor network preferably contributes, along with an output from the controller, to an input of the plant. In order to determine the next multi-dimensional boundary of values, an initial guess, P, of said stability range can be made; this initial guess, P, being proportional to a vector N, according to the expressions below:

$$N=(W_t,V_t)=(n_1,n_2,\ldots)$$

$$P = \frac{N}{\sum_i n_i}$$

In the event one of the updated weight values reaches the first boundary, a next sequence is carried out to determine a next multi-dimensional boundary of values and to generate a plurality of next updated weight values. In the event one of the next updated weight values reaches this next boundary, a third sequence is carried out to determine a third multi-dimensional boundary of values and to generate a plurality of third updated weight values; and so on, targeting a generally optimal state of system control-until a system disturbance occurs-thus, launching another series of sequences, each including a stability phase and learning phase, allowing for on-line training of the RL agent in a manner that maintains system stability while targeting a state of optimal system control. For example, the method may be carried out such that one of the next updated weight values reaches the next boundary so that a third sequence is carried out to determine a third multi-dimensional boundary of values comprising a third stability range and to generate a plurality of third updated weight values; thereafter, one of these third updated weight values reaches its third boundary so that a fourth sequence is carried out to determine a fourth multi-dimensional boundary of values comprising a fourth stability range and to generate a plurality of fourth updated weight values.

It is possible that only a couple of sequences may need to be carried out, or a large number of sequences are needed to reach an acceptable optimal system control. During each learning phase, preferably to refrain from engaging the learning phase for an indefinite time with little or no improvement to control performance, on-line training is performed either until a current boundary is reached or until a total number of updated weight values reaches a preselected value, at which time the current learning phase is exited. And, if optimal performance has been reached during that current learning phase such that no further on-line training of the reinforcement learning agent is necessary, no new sequence need be carried out. If, on the other hand, the total number of updated weight values generated equals the preselected value and optimal performance has not been reached, then a next boundary is determined providing a new stability range within which a subsequent learning phase can be carried out.

BRIEF DESCRIPTION OF THE DRAWINGS

For purposes of illustrating the innovative nature plus the flexibility of design and versatility of the preferred system and technique disclosed hereby, the invention will be better appreciated by reviewing accompanying drawings (in which like numerals, if included, designate like parts). One can appreciate the many features that distinguish the instant invention from known feedback control systems and techniques. The drawings have been included to communicate the features of the innovative system and method of the invention by way of example, only, and are in no way intended to unduly limit the disclosure hereof.

FIG. 1 schematically depicts components of a feedback control system 10 of the invention, also adaptable for carrying out a method of the invention.

FIGS. 2A–2B schematically depict functional aspects of alternative embodiments of an actor network component 22 and critic network component 24 of the invention.

FIG. 3 diagrammatically represents the stability and learning phases of a first and next sequence carried out according to the invention for on-line training.

FIG. 4 diagrammatically represents the stability and learning phases of a multitude of sequences through which the system passes from a point 39 of initialized neural network weights to a point 48 representing the weight vector of optimal performance of the system. Two weight trajectories have been plotted here: 44, 46.

BRIEF DESCRIPTION OF ATTACHMENT A

Figure 5:
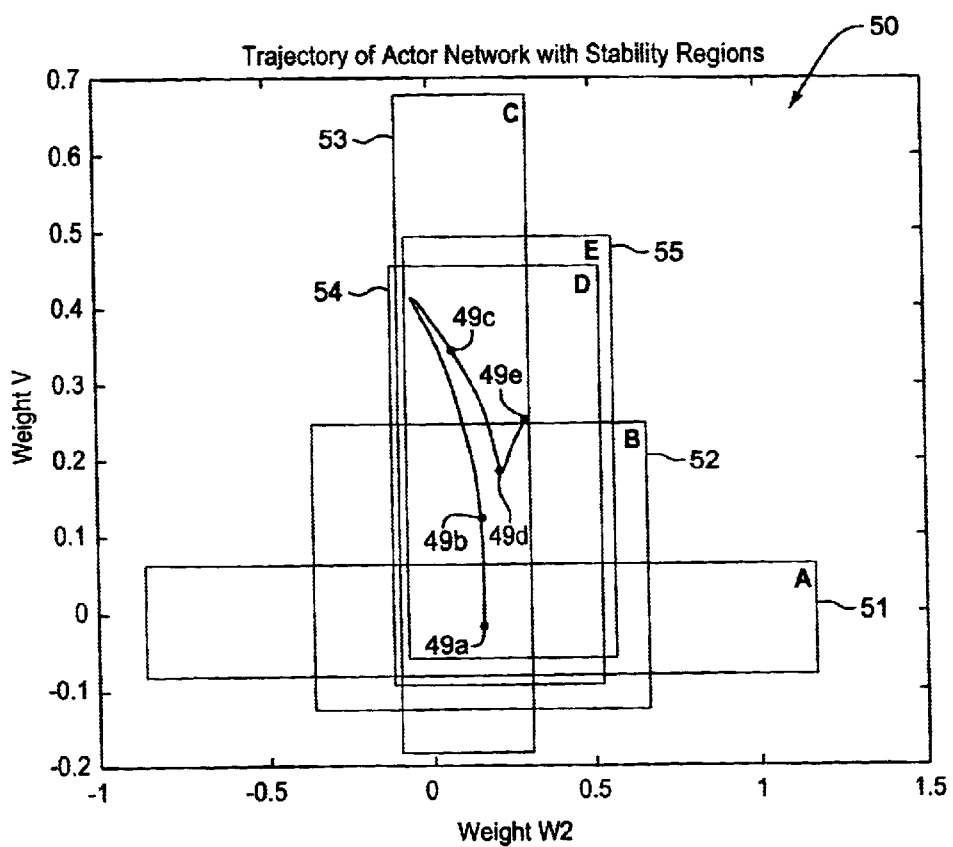
FIG. 5 diagrammatically represents, at 50 in the form of 2-dimensional plots for simplicity, the stability and learning phases of a multitude of sequences through which a reduced 2-dimenisonal version of the system depicted in FIG. 8 passes from a point 49a of initialized neural network weights to a point 49e representing the weight vector of optimal performance of the system.

The following enclosure, labeled ATTACHMENT A, is hereby incorporated herein by reference to the extent necessary to aid in a thorough understanding of the general technical background and the invention:

ATTACHMENT A is a 25-page manuscript authored by the applicants entitled *"Robust Reinforcement Learning Control with Static and Dynamic Stability"*, included for its general technical background and analysis of the invention.

DETAILED DESCRIPTION OF THE PREFERRED EMBODIMENTS

FIG. 1 schematically depicts components of a feedback control system 10 of the invention, also adaptable for carrying out a method of the invention. The critic network (or simply "net") 14 is included to learn the value function (Q-values); its two inputs by way of example as shown here, are system state (such as a current tracking error, e) and the actor network's control signal, a. The critic net 14 forms the Q-values for these inputs (as shown here, by way of example, the value function is the expected sum of future squared tracking errors). The actor network implements the current policy. Here by way of example, given the input of the system state (here, a tracking error, e), the actor net produces a continuous-valued action (a) as output. In general, the system state into the actor net and the critic net will be those variables that comprise the state(s) for the particular control application and neural net being trained. By no means is the instant invention restricted to cases in which the entire state can be represented by the error (e), as this is seldom the case. The system 10 includes a plant 19 controlled by controller 18 (with feedback input 11) connected in parallel with the RL agent comprised of an actor 12 and critic 14. The technique of the invention, as one will further appreciate, employs a repetition of stability phases and learning phases to train the neural network on-line while the controller controls the system. Additionally, further detail of the rigorous mathematical and engineering analyses done, as well as a simulation of, the unique features of the system and technique of the invention, can be found within ATTACHMENT A. Although certain details of experimental use in connection with HVAC is specified within ATTACHMENT A, one is certainly not limited thereto. The technique of the invention, including its unique on-line reinforcement learning technique for continual improved performance in connection with controlling a system that incorporates feedback control, can be applied to any control system that provides device control signals for altering a process/plant, especially a system whereby the controller has at least one input port for receiving an input signal representing at least one process/plant condition defining the process/plant—such process/plant input signal(s) having been created using a systems variable(s) produced by, for example, a signal(s) from at least one sensor or a setpoint (for example, in HVAC, can include sensor(s)/meter to measure airflow, temp of air and water, etc.).

FIGS. 2A–2B schematically depict functional aspects of alternative embodiments of an actor network component 22 and critic network component 24 of the invention. FIG. 2A depicts a feed-forward, two-layer neural network 22 parameterized by input and output weight values, respectively, W and V. FIG. 2B depicts a table look-up mechanism 24 whereby a state and action pair comprising a state, s, (or as shown here, tracking error, e) and a control signal output from the actor network, a, produces the value function therefor, Q(s, a)-or as shown here, Q(e, a). While the function of the critic network 14 can be accomplished by a table look-up shown here by way of example at 24, any suitable control mechanism may be used including another neural net or other value function approximator.

Figure 9:
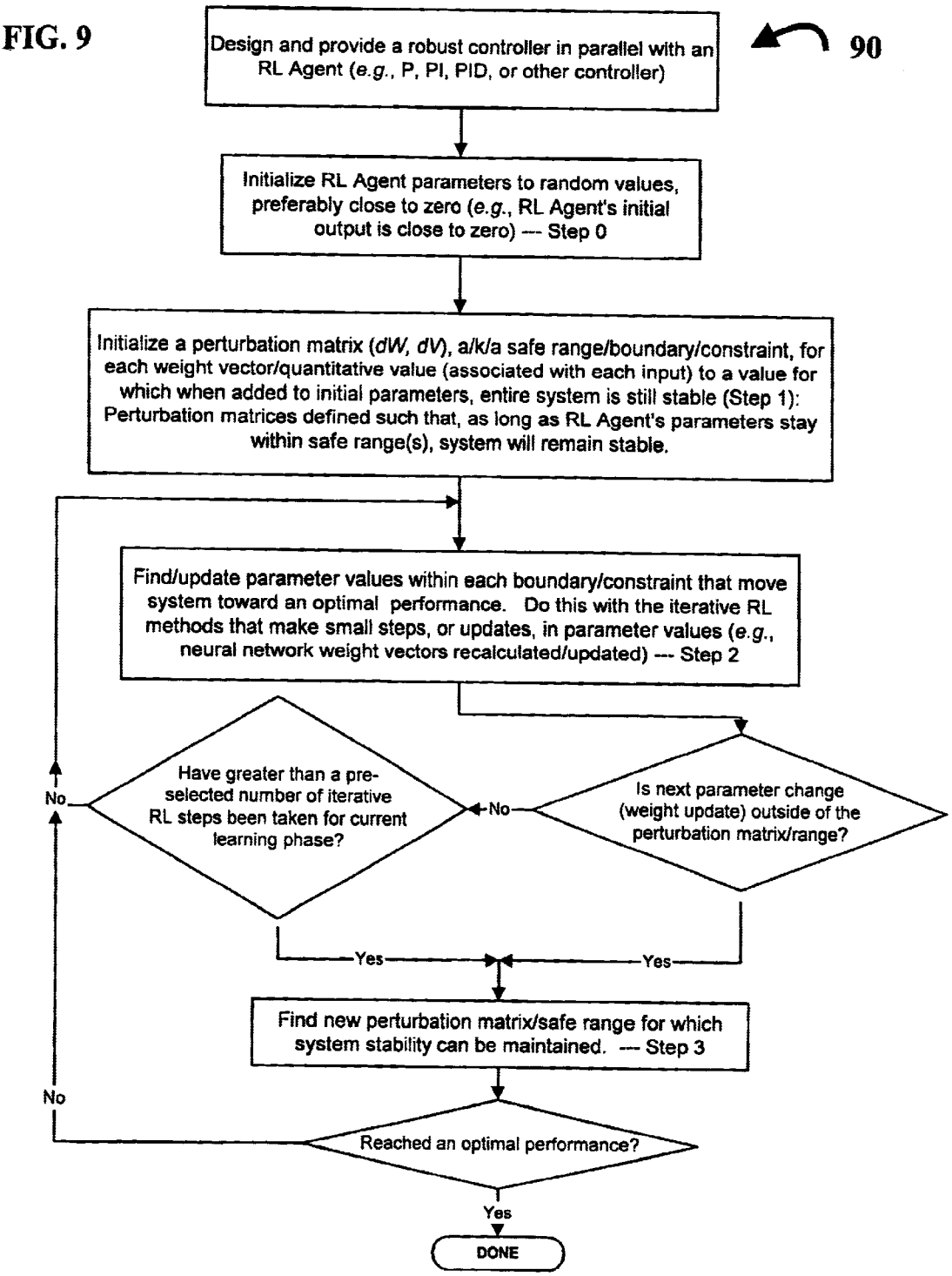
FIG. 9 is a flow diagram depicting features of a method 90 of the invention including details further distinguishing this novel technique from known systems.

FIG. 3 diagrammatically represents at 28 the stability and learning phases of a first and next sequence carried out according to the invention for on-line training. During each stability phase, a perturbation matrix 31, 34—sometimes referred to as 'safe region' or 'stability range/region'—is estimated such that the system can remain stable so long as neural net weights remain therewithin. When one or more of the weights (trajectory 32) approaches the boundary 31 of the current stability range, a new range 34 is calculated. For further reference, see the flow diagram labeled FIG. 9, illustrating features describing certain aspects of a preferred method of the invention. The boundaries (stability matrices) are illustrated in the form of rectangles defined according to the technique of the invention, and the path 32 depicts an example trajectory of the neural network weights (or other quantifiable values identified in connection with employing an RL agent, whether in the form of a traditional neural network typically parameterized by weights, or an improvement thereof), as they move.

FIG. 4 diagrammatically represents the stability and learning phases of a multitude of sequences through which the system passes from a point 39 of initialized neural network weights to a point 48 representing the weight vector of optimal performance of the system. Two weight trajectories are graphically depicted: 44 and 46. Trajectory 44 is the path the control system will take while attempting on-line training of a learning agent that does not employ an RL agent to carry out the sequences according to the invention. As one can appreciate, pathway 44 enters and travels through an unstable region, defined and labeled 42, which represents the learning agent weight parameters that will inevitably cause the system to crash. Trajectory 46 is the path a control system employing the RL agent of the invention to carry out at least one sequence of a stability and learning phase, will take. One can readily see that pathway 46 remains outside of the stability region 42. This is a result of carrying out one or more sequences including a respective stability phase to generate a respective boundary (shown, here, as a series of overlapping rectangular structures, since an IQC technique was applied to generate the successive boundaries-although other suitable stability programming tools may be applied) and allowing on-line learning to take place within each respective boundary.

Figure 7:
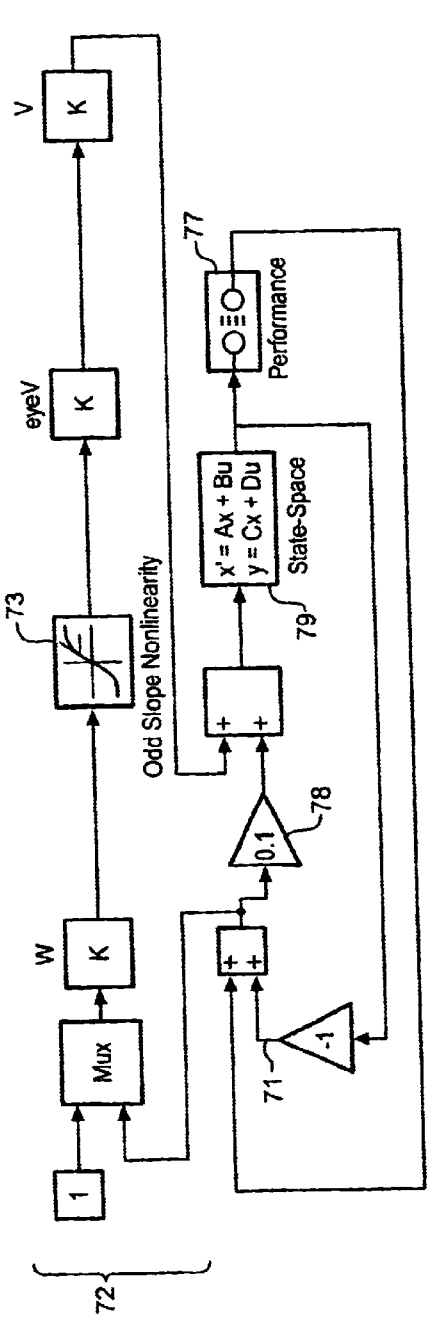
FIG. 7 is the control system diagrammed in FIG. 6 to which IQC (Integral Quadratic Constraint) analysis has been applied, thus resulting in a modification of the neuro-controller of FIG. 6.
Figure 8:
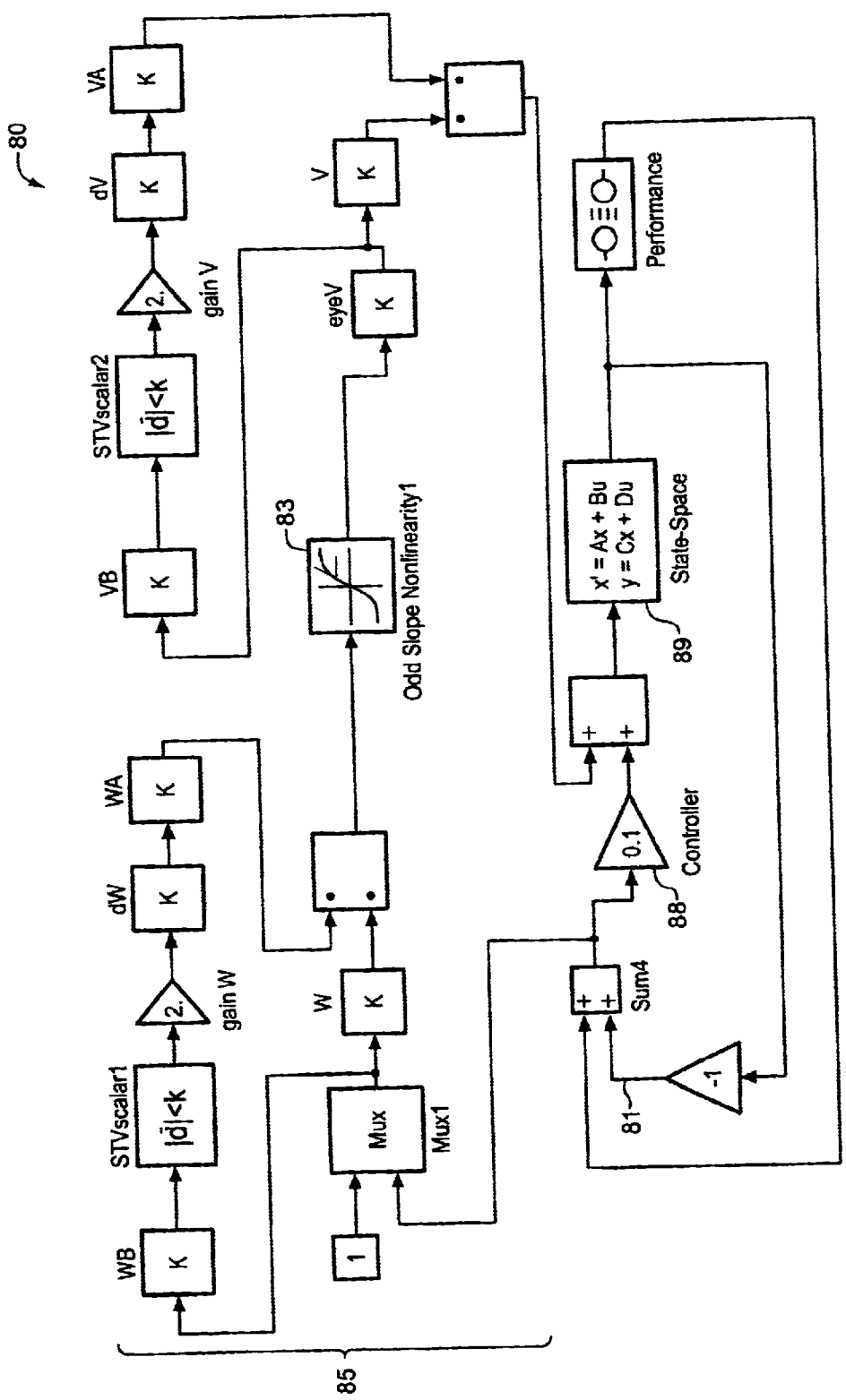
FIG. 8 is the control system diagrammed in FIG. 7 to which an STV (Slowly Time-Varying) IQC block to capture the weight change uncertainty was added to produce a system 80 for which analysis can be depicted in 2-d.

FIG. 5 diagrammatically represents, at 50 in the form of 2-dimensional plots for simplicity, the stability and learning phases of a multitude of sequences through which the system depicted in FIG. 8 (reduced to allow for simplified viewing in 2-D) passes from a point 49a of initialized neural network weights to a point 49e representing the weight vector of optimal performance of the system. The method is a repetition of sequences comprising a stability phase followed by a learning phase. In the stability phase for a 2-d case, the maximum additives, dW and dV, are estimated which allow the system to retain system stability. In the learning phase, the neural network weights are adjusted until one of the weights approaches the boundary of its stability (safe) range computed in the stability phase. In order to present the information in a 2-dimensional plot, for simplicity as depicted in FIG. 5, a minimal actor network is used: only one hidden unit tanh is used. Thus, the actor network has two inputs (the bias=1 and the tracking error, e), one tanh hidden unit, and one output, a. While a system with one hidden tanh is sufficient to function for training the control function of the network example depicted in FIGS. 6–9, in practice, three hidden units often resulted in faster learning and slightly better control. To visualize the neuro-dynamics of the actor net, the trajectories of the individual weights in the actor network were tracked and plotted as they change during learning. The weights $W_2$ and V form a two-dimensional picture of how the network changes during the learning process (plotted at 50) of a typical training episode. Here, by way of example, the x-axis shows the second input weight $W_2$ while the y-axis represents the single output weight V. The trajectory begins with point 49a and progresses to point 49e. Each point along the trajectory represents a weight pair ($W_2$, V) achieved at some point during the learning process. The jagged pathway between the points labeled 49a–49e, represent different sequential learning phases of the method, each corresponding with a respective stability region, 51–54.

Several stability (safe) ranges are depicted as rectangular boxes 51–54 in the two-dimensional trajectory plot of FIG. 5; the first is labeled box 51(A). A first stability phase is carried out by computing, via applying either an I-analysis tool or the IQC-analysis tool, the amount of uncertainty which can be added to the weights; the resulting perturbations, dW and dV (sides of the rectangle 51), indicate how much learning can be performed yet remain stable. The pathway from 49a to the edge of box 51(A) of the trajectory represents the learning that occurred for the first values of dW and dV. After the first learning phase, another stability phase is performed to compute new values for dW and dV, shown by rectangular shape 52(B). A second learning phase is entered, represented by path 49b, that proceeds until a weight update reaches the then-current allowed range 52(B). The process of alternating stability and learning phases repeats until the neural network is satisfactorily trained. In the example of FIG. 5, a total of five sequences of a stability and learning phase are carried out.

As can be seen from the trajectory between 49a and the boarder of 51(A), by way of example here, the on-line training progresses until the V weight reaches an edge of boundary 51(A). At this point the current learning phase is halted, because any additional weight changes (weight updates) might result in an unstable control system (it is possible that the system might still be stable, but there is no longer any guarantee of system stability). A next boundary 52(B) is computed or determined using a second stability phase; followed by a next/second learning phase represented by jagged path from 49b until the weights almost violate the next boundary 52(B). In this way the technique of the invention alternates between stability phases (computing bounding boxes) and learning phases (adjusting weights within the bounding boxes). An aside note: If a trajectory reaches the edge of a respective bounding box, a more accurate then-current stability region may be determined by adjusting the center and aspect ratio of the box (and then recomputing the maximum box size with these new parameters), or an adjustment might be made to the on-line training learning rate, or some other modification.

The third trajectory component from 49b to 49c reveals some interesting dynamics. This portion of the trajectory stops near the edge of box 53(C)-that is to say it doesn't reach it-and then moves back toward the middle of that box 53(C). Note that, here, at the same time as the actor network is learning, the critic network is also learning and adjusting its weights along with being busy forming the value function. It is during this third phase in the training that the critic network has started to mature; the "trough" in the critic network has started to form. Because the critic network directs the weight changes for the actor network, the direction of weight changes in the actor network reverses. In the early part of the learning the critic network indicates that "upper left" is a desirable trajectory for weight changes in the actor network. By the time the third learning phase is encountered around point 49c and within boundary box 53(C), the gradient in the critic network has changed to indicate that "upper-left" is now an undesirable direction for movement for the actor network. The actor network has "over-shot" its mark. If the actor network has higher learning rates than the critic network, then the actor network would have continued in that same "upper-left" trajectory, because the critic network would not have been able to learn quickly enough to direct the actor net back in the other direction. Similar type dynamics are revealed in the last two phases around points 49d and 49e, associated with boundaries 54(D) and 55(E). Here, the actor network weights are not changing as rapidly as they did in the earlier learning phases. The on-line training is reaching a point of optimal tracking performance according to the critic network. The point of convergence of the actor network weights is a local optimum in the value function of the critic network weights. It is preferred to halt training at this point because the actor weights have ceased to move much, if at all, and the resulting control function improves performance (minimizes tracking error) over the nominal system.

Figure 6:
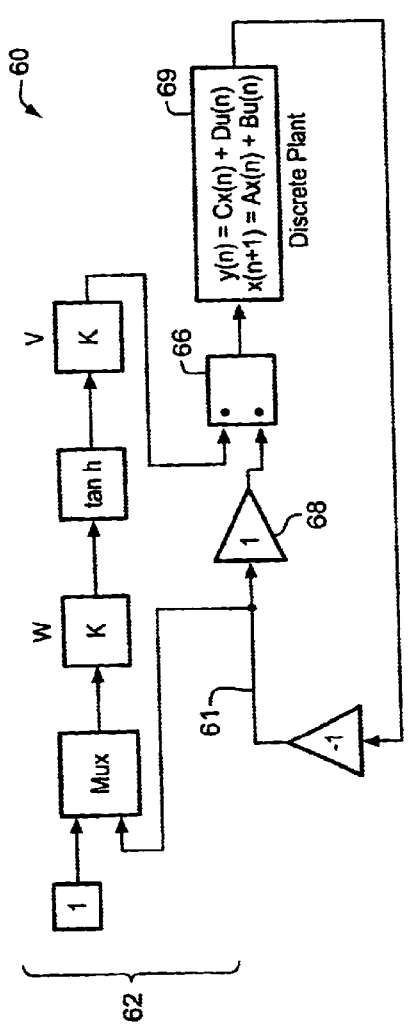
FIG. 6 is a control system diagram of an embodiment that has a plant, a proportional controller, plus a neuro-controller (including the tanh function) operating as an actor network, in parallel with the nominal controller-no critic network is depicted here for simplicity.

FIG. 6 is a control system diagram 60 of an embodiment that has a plant 69, a proportional controller 68 with feedback input 61, plus a neuro-controller 62 (including the tanh function) operating as an actor network, in parallel with the nominal controller-no critic network is depicted here for simplicity. The neural network 62 depicted, here, is parameterized by input and output weight values, respectively, W and V, and includes the nonlinearities associated with use of the tanh function.

FIG. 7 is the control system diagrammed in FIG. 6 to which IQC (Integral Quadratic Constraint-a known tool which can be used for verifying the stability of systems with uncertainty) analysis has been applied. Here in system 70, the neuro-controller of FIG. 6 has been modified as follows: the nonlinear tanh function has been replaced with an odd-slope nonlinearity (73). Additionally, another IQC block-a performance block (77)-has been added to trigger an analysis of the system. Thus, FIG. 7 depicts the FIG. 6 system converted into an IQC robustness analysis framework. The system 70 includes a plant 79 being controlled by nominal controller 78 (with feedback input 71) connected in parallel with neural network 72.

FIG. 8 is the control system diagrammed in FIG. 7 to which an STV (Slowly Time-Varying) IQC block to capture the weight change uncertainty was added. According to the invention (labeled FIG. 8, in ATTACHMENT A) the nonlinear tanh function was replaced (as in FIG. 7) and IQC-analysis is incorporated into the system to compute maximum allowed perturbations for the actor network weights, which are in turn used in the RL Agent's (at 85) learning phase to 'safely' adjust actor net weights therewithin. The matrices dW and dV are the perturbation matrices of this system, with matrices WA, WB, VA, and VB are included to cast the uncertainty into standard block-diagonal form. A simple first-order system 80 is depicted here by way of example, only, as other neuro-controller subsystems can be used. The system 80 includes a plant 89 controlled by controller 88 (with feedback input 81) connected in parallel with RL agent 85. The function learned by the actor net of system 80, for example, can be described as follows: for negative tracking errors (e<0) the system will learn to output a strongly negative control signal, and for positive tracking errors, the network will learn to produce a positive control signal. The actor net of the RL agent 85 is a direct part of system 80 while the critic net does not directly affect the feedback/control loop of the system (but rather, it influences the speed of adaptation of the weights).

FIG. 9 illustrates, in flow diagram format, certain aspects and features of a preferred method of the invention at 90. As one will appreciate, by following the detailed explanation in each box shown in the flow-diagram a better understanding of the control system's operation as well as in appreciating the novel features of a method of the invention can be gained. In connection with FIG. 9, details of a process to build a system according to the invention are specified below:

1. Check the stability of the nominal system (without the neuro-controller). Recall that BIBO stability presupposes internal stability of the nominal system.
2. If the nominal system is stable (step 1 above), then add the neuro-controller, replace the non-LTI neural controller with an LTI uncertainty block, and perform a static stability check with either the I-analysis or IQC-analysis stability tools. This is done to increase confidence that the initial weight values of the neuro-controller implement a stable system. Initially, choose the network output weights to be small so that the neuro-controller has little effect on the control signal of the system.

3. The next step is a stability phase to compute a maximum network weight uncertainty that retains system stability, use the following subroutine:
   (a) For each individual weight in the neural network, select an uncertainty factor. These uncertainty factors are the diagonal entries in the BP matrix.
   (b) Combine all the uncertainty into the M—ALFT arrangement and apply either the $\mu$-analysis tool or the IQC-analysis tool.
   (c) If $\mu$ (or IQC) indicates that system is stable, increase each individual weight uncertainty factor; multiply all the weights by the same factor to keep all the ratios constant. But, if $\mu$ (or IQC) indicates that system is unstable, decrease each individual weight uncertainty by multiplying each weight by the same factor to keep all the ratios fixed.
   (d) Repeat sub-steps in 3(c) until the largest set of individual weight perturbations in the $B_P$ matrix that still just barely retain system stability have been identified. This is the maximum amount of perturbation each weight can experience while still retaining a stable control system.

4. Use these uncertainty factors to compute a permissible perturbation range, $R_{w_i}$, for each individual network weight. The perturbation range is the "safe range" for each individual weight such that all perturbations to a weight that keep the weight within this range will not induce system instability.

5. Enter the learning phase. One could employ any suitable learning algorithm that updates the neuro-controller weights up and until the allowable safe perturbation range is violated.
   (a) Train on one sample input.
   (b) Compute the desired weight updates.
   (c) As long as weight update(s) do not exceed any current perturbation range, continue to update the weights. But, if any of the weight updates do exceed a perturbation range, stop learning with the last set of allowable network weights.

Referring, once again specifically to FIGS. 1 and 2A–2B, a summary of a preferred embodiment of the system detailing the actor and critic network components, follow.

Example Actor Net Features:
Feed-forward, two-layer, neural network;
Parameterized by input and output weights, Wand V;
n (# inputs) determined by the control task. For many tasks, this includes the tracking error and possibly additional plant state variables. Also included is an extra variable held constant at 1 for the bias input.
m (# outputs) determined by the control task. This is the number of control signals needed for the plant input.
h (# hidden units)—a free variable which can be selected to be small for faster learning or larger for more expressive control functionality.
tanh hidden unit activation functions;
linear output unit activation functions;
e(k) is the input signal at time k. The signal is composed of the tracking error and additional plant and controller internal state variables. Also includes the bias input set to 1.

û(k) is the output signal at time k. Important note about notation: Recall above, as well as in FIGS. 1, 2A–2B, a is used rather than û. Computed by the actor net via feed forward computation:

$$\phi_j = \sum_{i=1}^{n} W_{i,j} e_i,$$

$$\hat{u}_k = \sum_{j=1}^{h} V_{k,j} \tanh(\phi_j).$$

Trained via back propagation (gradient descent).
Example Critic Net Features:
Table look-up mechanism;
Parameterized by table, Q;
n−1+m inputs determined by the control task. The input to the critic network includes the actor net input, e(k) (without bias term) and the actor net output, û(k) signals. The actor net input has n−1 signals (without bias term) and the actor net output has m signals for a total n −1+m input signals to critic net.
A single output, the value function Q(e, û);
Trained via suitable variants of reinforcement learning.

Referring generally back to FIGS. 1, 2A–2B, and 5–8, in support of the invention, further derivation is offered. The actor network 12 receives the tracking error e and produces a control signal, a, which is both added to the traditional control signal (16) and is fed into the critic network 14. The critic network 14 uses e (the state) and a (the action) to produce as its output, the Q-value which evaluates the state/action pair. The critic net, via local search, is used to estimate the optimal action to update the weights in the actor network. Let n be the number of inputs to the actor network. For most tasks, this includes the tracking error and possibly additional plant state variables. Also included, is an extra variable held constant at 1 for the bias input. Let m be the number of components in the output, a, of the actor network. This is the number of control signals needed for the plant input. Let h be the number of hidden units in the actor network. A 'best' value for h can be determined experimentally.

The hidden layer weights are given by W, an h×n matrix, and the output weights are given by V, an m×h matrix. The input to the actor network is given by vector x, composed of the error, e, between the reference signal, r, and the plant output, y, and of a constant input that adds a bias term to the weighted sum of each hidden unit. Other relevant measurements of the system could be included in the input vector to the actor network, but for the simple experiments described here, the only variable input was e. The critic receives inputs e and a. An index into the table of Q values stored in the critic is found by determining which e and a partition within which the current error and action values fall. The number of partitions for each input is determined experimentally.

In the following summary of the steps of a method of the invention, focus is on RL steps and the interaction of the nominal controller, plant, actor network, and critic. Variables are given a time step subscript. The time step is defined to increment by one as signals pass through the plant. One can calculate the error between the reference input and the plant output:

$$e_t = r_t - y_t$$

Next, calculate the outputs of the hidden units, $\Phi_t$, and of the output unit, which is the action, $a_t$:

$$\Phi_t = \tan h(W_e e_t)$$

$$a_t = \begin{cases} V_t \Phi_t, & \text{with probability } 1 - \epsilon_t; \\ V_t \Phi_t + a_{rand}, & \text{with probability } \epsilon_t, \text{ where } a_{rand} \text{ is a} \\ & \text{Gaussian random variable with mean 0} \\ & \text{and variance 0.05} \end{cases}$$

The Following Steps are Repeated

Apply the fixed, feedback control law, f, to input $e_t$, and sum the output of the fixed controller, $c_t$, and the neural network output, $a_t$, to get $u_t$. This combined control output is then applied to the plant to get the plant output $y_{t+1}$ for the next time step through the plant function g.

$$c_t = f(e_t)$$

$$u_t = c_t + a_t$$

$$y_{t+1} = g(u_t)$$

Again calculate the error, $e_{t+1}$, and the hidden and output values of the neural network, $\Phi_{t+1}$ and $a_{t+1}$:

$$e_{t+1} = r_{t+1} - y_{t+1}$$

$$\Phi_{t+1} = \tan h(W_t e_{t+1})$$

$$a_{t+1} = \begin{cases} V_t \Phi_{t+1}, & \text{with probability } 1 - \epsilon_{t+1}; \\ V_t \Phi_{t+1} + a_{rand}, & \text{with probability } \epsilon_{t+1}, \text{ where } a_{rand} \text{ is a} \\ & \text{Gaussian random variable with mean 0} \\ & \text{and variance 0.05} \end{cases}$$

Now assign the reinforcement, $R_{t+1}$, for this time step. For the experiments presented here by way of example, define the reinforcement to be the absolute value of the error, $$R_{t+1} = |e_{t+1}|.$$

Let $Q_{index}$ be a function that maps the value function inputs, $e_t$ and $a_t$, to the corresponding index into the Q table. To update the neural network, first estimate the optimal action, $a_t^*$, at step t by minimizing the value of Q for several different action inputs in the neighborhood, A, of $a_t$. The neighborhood is defined as $$A = \{a_i | a_i = a_{min} + i(a_{max} - a_{min})/n, i=1, \ldots, n, a_{min} < a_i < a_{max}\}$$

for which the estimate of the optimal action is given by $$a_t^* = \underset{a \in A}{\arg\min} Q_{Q_{index}(e_t, a)}$$

Updates to the weights of the neural network are proportional to the difference between this estimated optimal action and the actual action:

$$V_{t+1} = V_t + \beta(a_t^* - a_t)\Phi_t^T$$

$$W_{t+1} = W_t + \beta V^T (a_t^* - a_t) \cdot (1 - \Phi_t \cdot \Phi_t) e_t,$$

where · represents component-wise multiplication. Now, update the value function, Q. The Q indices, $q_t$, for step t and for step t+1 are calculated first, then the Q value for step t is updated:

$$q_t = Q_{index}(e_t, a_t)$$

$$q_{t+1} = Q_{index}(e_{t+1}, a_{t+1})$$

$$Q_{qt} = Q_{qt} + \alpha(R_{t+1} + \gamma Q_{qt+1} - Q_{qt})$$

Next, determine whether or not the new weight values, $W_{t+1}$ and $V_{t+1}$, remain within the stable region S. Note that initial values for W and V are random variables from a Gaussian distribution with mean zero and variance of 0.1. The stable region S is always a rectangle in the multi-dimensional weight space and is initially centered at zero with size determined by an iterative expanding search involving small increases to the size and a corresponding IQC analysis to determine stability until a maximum size is reached or instability is determined. After calculating changes to V and W, if the new weight values fall within S, S remains unchanged. Otherwise a new value for S is determined.

If $(W_{t+1}, V_{t+1}) \in S_t$, then $S_{t+1} = S_t$, else $W_{t+1} = W_t$ $V_{t+1} = V_t$ $S_{t+1} = \text{newbounds}(W_t, V_t)$ End Repeated Step Section Now, according to the next stability phase, to calculate new bounds, S, do the following steps. First, collect all of the neural network weight values into one vector, N, and define an initial guess at allowed weight perturbations, P, as factors of the current weights. Define the initial guess to be proportional to the current weight values.

$$N = (W_t, V_t) = (n_1, n_2, \ldots)$$

$$P = \frac{N}{\sum_i n_i}$$

Next, adjust these perturbation factors to estimate the largest factors for which the system remains stable. Let $z_u$ and $z_s$ be scalar multipliers of the perturbation factors for which the system is unstable and stable, respectively. Initialize them to 1.

$$z_u = 1$$

$$z_s = 1$$

Increase $z_u$ until system is unstable:
  If stable for N±P·N,
  then while stable for N±$z_s$P·N do $$z_u = 2z_u$$

Decrease $z_s$ until system is stable:
  If not stable for N±P·N,
  then while stable for N±$z_s$P·N do $$z_s = \frac{1}{2} z_s$$

Perform a finer search between $z_s$ and $z_u$ to increase $z_s$ as much as possible:

$$\text{While } \frac{z_u - z_s}{z_s} < 0.05 \text{ do } z_m = \frac{z_u + z_s}{2}$$

If not stable for N±$z_m$P·N
  then $z_s = z_m$
  else $z_u = z_m$

Now define the new stable perturbations, which in turn define the set S of stable weight values.

$$P = z_s P = (p_1, p_2, \ldots)$$

$$S = \{[1-p_1)n_1, (1+p_1)n_1] \times [(1-p_2)n_2, (1+p_2)n_2] \times \ldots\}$$

The control system will remain stable as neural network weight values are changed, so long as the new weight values do not exceed the stability range (in both magnitude and learning rate) specified by the perturbation matrices, dW and dV. In the learning phase, reinforcement learning is employed until one of the network weights approaches the boundary of the stability range computed via IQC analysis. A system was tested for a 10 second period (1000 discrete time steps with a sampling period of 0.01). The sum of the squared tracking error (SSE) over the 10 second interval was computed. For the nominal controller only, the SSE=33.20. Adding the neuro-controller reduced the SSE to 11.73. The reinforcement learning neuro-controller was able to improve the tracking performance dramatically for the simple first-order system tested.

Further Discussion and Analysis of Neural Networks: $\mu$-Analysis and IQC

While there are a multitude of neural networks from which one can select to perform the actor network function, preferably (see FIG. 2A) the actor net architecture includes two feed forward layers, a nonlinear hyperbolic tangent function (tanh) in the activation layer, and a linear (no activation function) output layer. Begin with the conversion of the nonlinear dynamics of the hidden layer of the neural network depicted in FIG. 6, into an uncertainty function. Consider a neural network with input vector $e=(e_1, \ldots, e_n)$ and output vector $\hat{u}=(\hat{u}_1, \ldots, \hat{u}_m)$. Important to note: for purposes of this further discussion, the designation used for neural network output, a, has been replaced with $\hat{u}$. The network has h hidden units, input weight matrix $W_{h \times n}$, and output weight matrix $V_{m \times h}$ where the bias terms are included as fixed inputs. The hidden unit activation function is the commonly used hyperbolic tangent function. The neural network computes its output by:

$$\phi_j = \sum_{i=1}^{n} W_{i,j} e_i,$$

$$\hat{u}_k = \sum_{j=1}^{h} V_{k,j} \tanh(\phi_j).$$

One can write this in vector notation as $$\Phi = We,$$

$$T = \tan h(\Phi),$$

$$\hat{u} = VT.$$

Next, consider an LTI system with a neural network as a non-LTI component. Recall that the network is a two-layer, feed forward network with tanh activation functions in the hidden layer. The network has two sets of weight matrices: $W_{h \times n}$ is the input-side weight matrix and $V_{m \times h}$ is the output-side weight matrix (n inputs, h hidden units, and m outputs with the bias terms included as fixed inputs). Form the matrix B as a diagonal matrix in which the weights of W and V are distributed along the diagonal $$B = \begin{bmatrix} W_{1,1} & & & & & & \\ & W_{1,2} & & & & & \\ & & \ldots & & & & \\ & & & W_{h,n} & & & \\ & & & & V_{1,1} & & \\ & & & & & \ldots & \\ & & & & & & V_{m,h} \end{bmatrix}.$$

Matrix B is of size zxz where z=hn+mh. Now form a diagonal matrix $B_P$ (the P subscript denotes perturbation) also of size zxz by:

$$B_P = \begin{bmatrix} B_{P_1} & & & \\ & B_{P_2} & & \\ & & \ldots & \\ & & & B_{P_z} \end{bmatrix},$$

where each $B_{P_1} \in \Re$. Finally, we form a diagonal matrix $\Delta_L$ (the L subscript denotes learning) again of size zxz:

$$\Delta_L = \begin{bmatrix} \delta_{l_1} & & & \\ & \delta_{l_2} & & \\ & & \ldots & \\ & & & \delta_{l_z} \end{bmatrix},$$

where $\delta_{l_i}[-1, 1]$ is the unit uncertainty function as described in the previous section on static stability. These square matrices, B, $B_P$, and $\Delta_L$, are all diagonalized so that when they are multiplied together, the corresponding entries of each matrix will multiply together.

Summary of Stability Phase in Pseudo Code Format:
1. Inputs:
    P: The control system (used for $\mu$ or IQC calculations),
    W, V: The current neuro-controller weights which form B.
2. Initialize the individual neural network weight perturbations in $B_P$. Set each perturbation, $B_{pi}$, proportional to its corresponding weight in B.

$$B_{Pi} = \frac{B_i}{\sum B}$$

3. Set: $B_{base} = B_P$, min $f=1$, max $f=1$
4. Arrange the overall system, P, and the LTI uncertainty (with $B_P$) into the M-$\Delta$ LFT. Compute $\mu$ (or IQC).
5. If $\mu$ (or IDC) indicated that the system is stable, then
    While (system is stable) do
    Begin
        max $f$=max $f$2
        $B_P = B_{base} *$ max $f$
        recompute $\mu$ (or IQC)
    End
6. Else if $\mu$ (or IQC) indicates that the system is not stable, then
    While (system is not stable) do
    Begin
        min $f$=min $f \div 2$
        $B_P = B_{base} *$ min $f$
        recompute $\mu$ (or IQC)
    End 7. Reduce the range between min $f$ and max $f$ by:

$$\text{While} \left( \frac{\max f - \min f}{\min f} < 0.05 \right)$$

Begin test = $\min f + (\max f - \min f)/2$ compute $\mu$ for $B_P = B_{base} * \text{test}$ if stable, then $\min f$ = test, else $\max f$ = test End 8. Return $B_{base}* \min f$
END.
Summary of Learning Phase in pseudo code format:
1. Inputs:
   P: The system (used for $\mu$ or IQC calculations),
   W, V: The current neuro-controller weights.
   Q: The current table look-up values.
   $B_P$: Set of actor net perturbations (computed in stability phase).
   c: A criteria for halting the training—may include preselected total number.
2. Initialize:
   e=current state of system (tracking error and possibly other variables).
   û=current actor net control action (Notation: a also used in discussion).
3. Take control action u=$u_c$+û and observe new state (tracking error) e'.
4. Choose next control action: û'=ε—greedy(e).

$$\left. \begin{array}{l} \Phi = \tanh(We') \\ \hat{u}' = \Phi V \end{array} \right\} \text{ with probability } 1 - \epsilon$$

û'=ΦV=random from 0.1 ($\hat{u}_{MAX}$–$\hat{u}_{MIN}$) withprobablity ε
5. Train critic network:

$$Q(e, \hat{u})=Q(e, \hat{u})+\alpha(\gamma(r-y+q)(e', \hat{u}'))-Q(e, \hat{u}))$$

6. Compute desired actor net output: û*=gradient_search (Q(e; *))
7. Train actor network:

$$V=V+\beta_1\Phi(\hat{u}*-\hat{u})$$

$$W=W+\beta_2 eV(1-\Phi^2)(\hat{u}*-\hat{u})$$

If W and V exceed perturbation ranges R, then retain previous values of W and V and exit learning phase.
8. Update state information: e=e', û=û'
9. If perturbation criteria c is net, then exit learning phase. Otherwise, go to Step 3.
END.

While certain representative embodiments and details have been shown merely for the purpose of illustrating the invention, those skilled in the art will readily appreciate that various modifications may be made to these representative embodiments without departing from the novel teachings or scope of this invention. Accordingly, all such modifications are intended to be included within the scope of this disclosure. Although the commonly employed preamble phrase "comprising the steps of" have been used herein, or hereafter, the applicants do not intend to invoke 35 U.S.C. Section 112 §6. Furthermore, any means-plus-function clauses used, or later found to be present, are intended to cover the structures described herein as performing the recited function and not only structural equivalents but also equivalent structures.

What is claimed is:

1. A feedback control system for automatic on-line training of a controller for a plant, comprising:
   a reinforcement learning agent connected in parallel with the controller; the learning agent comprising an actor network and a critic network operatively arranged to carry out at least one sequence of a stability phase followed by a learning phase; and
   wherein said stability phase comprises determining a multi-dimensional boundary of values, and said learning phase comprises generation of a plurality of updated weight values in connection with the on-line training, if and until one of said updated weight values reaches said boundary, at which time a next sequence is carried out comprising determining a next multi-dimensional boundary of values followed by a next learning phase.

2. The system of claim 1 wherein said actor network comprises a neural network and said critic network comprises a function approximator into which a state and action pair are input to produce a value function therefor.

3. The system of claim 2 wherein: said neural network is a feed-forward, two-layer network parameterized by input and output weight values, respectively, W and V; an input into said neural network includes a state variable, s; said state and action pair comprises said state, s, and a control signal output from said actor network, a, to produce said value function, Q(s, a); and said multi-dimensional boundary of values comprises a stability range defined by perturbation weight matrices, dW and dV.

4. The system of claim 3 wherein: said function approximator comprises a table look-up mechanism; said input and output weight values, respectively, W and V, are initialized by randomly selecting small numbers; an input signal of said neural network comprises information about a plurality of state variables of the controller, including said state which comprises a tracking error, e; and said control signal output from said actor network contributes, along with an output from the controller, to an input of the plant.

5. The system of claim 1 wherein:
   said actor network comprises a neural network parameterized by input and output weight values for current step t, respectively, $W_t$ and $V_t$;
   said multi-dimensional boundary of values comprises a stability range defined by perturbation weight matrices, dW and dV; and
   said determining of said next multi-dimensional boundary of values comprises making an initial guess, P, of said stability range, said initial guess, P, being proportional to a vector N, according to the expressions:

$$N(W_t,V_t)=(n_1,n_2, \ldots)$$

$$P = \frac{N}{\sum_i n_i}.$$

6. The system of claim 1 wherein one of said updated weight values reaches said boundary so that said next sequence is carried out to determine said next boundary and to generate a plurality of next updated weight values, one of said next updated weight values reaches said next boundary so that a third sequence is carried out to determine a third multi-dimensional boundary of values and to generate a plurality of third updated weight values.

7. The system of claim 1 wherein one of said updated weight values reaches said boundary so that said next learning phase is carried out to generate a plurality of next updated weight values; and the automatic on-line training is performed during said next learning phase if and until a total number of said plurality of updated weight values so generated reaches a preselected value, said next learning phase is exited.

8. A method for automatic on-line training of a feedback controller within a system comprising the controller and a plant, the method comprising the steps of:
   employing a reinforcement learning agent comprising a neural network to carry out at least one sequence comprising a stability phase followed by a learning phase;
   said stability phase comprising the step of determining a multi-dimensional boundary of neural network weight values for which the system's stability can be maintained; said learning phase comprising the step of generating a plurality of updated weight values in connection with the on-line training; and
   if, during said learning phase, one of said updated weight values reaches said boundary, carrying out a next sequence comprising the step of determining a next multi-dimensional boundary of weight values followed by a next learning phase.

9. The method of claim 8 wherein said learning agent comprises an actor network comprising said neural network and a critic network operatively arranged in parallel with the controller to carry out said at least one sequence; said learning phase further comprises accepting a state variable, s, into said neural network to produce a control signal output, a, and inputting a state and action pair into said critic network to produce a value function, Q(s, a); and further comprising the step of initializing input and output weight values, respectively, $W_i$ and $V_i$, of said neural network by randomly selecting small numbers.

10. The method of claim 9 wherein: said random selection comprises selection from a Gaussian distribution; said critic network comprises a function approximator into which said state and action pair, comprising a tracking error, e, and said control signal output, a, are input; and said multi-dimensional boundary of values comprises a stability range defined by perturbation weight matrices, dW and dV.

11. The method of claim 8 wherein said learning phase further comprises accepting a state variable, s, into said neural network to produce a control signal output, a, and inputting a state and action pair into a critic network of said reinforcement learning agent to produce a value function, Q(s, a); and said step of determining a next multi-dimensional boundary of weight values comprises making an initial guess, P, of said stability range, said initial guess, P, being proportional to a vector N, according to the expressions:

$$N(W_i, V_i) = (n_1, n_2, \ldots)$$

$$P = \frac{N}{\sum_i n_i}.$$

12. The method of claim 11 wherein said step of determining a next multi-dimensional boundary of weight values, said boundary comprising a next stability range defined by perturbation weight matrices, dW and dV, further comprises estimating a maximum perturbation factor for which the system's stability will be maintained, for each of an input and output weight value for current step t, respectively, $W_t$ and $V_t$.

13. The method of claim 8 wherein one of said updated weight values reaches said boundary so that said next sequence is carried out to determine said next boundary comprising a next stability range defined by perturbation weight matrices, dW and dV, and said next learning phase is carried out by generating a plurality of next updated weight values.

14. The method of claim 13 wherein one of said next updated weight values reaches said next boundary so that a third sequence is carried out to determine a third multi-dimensional boundary of values comprising a third stability range and to generate a plurality of third updated weight values; and thereafter, one of said third updated weight values reaches said third boundary so that a fourth sequence is carried out to determine a fourth multi-dimensional boundary of values comprising a fourth stability range and to generate a plurality of fourth updated weight values.

15. The method of claim 13 wherein: if, during any respective one of said learning phases, a total number of said plurality of updated weight values so generated reaches a preselected value, exit said respective learning phase.

16. The method of claim 15 wherein one of said updated weight values reaches said boundary so that said next learning phase is carried out to generate a plurality of next updated weight values; and the automatic on-line training is performed during said next learning phase such that said total number equals said preselected value before any of said next updated weight values reaches and exceeds said next multi-dimensional boundary of values.

17. A computer executable program code on a computer readable storage medium, for on-line training of a feedback controller within a system comprising the controller and a plant, the program code comprising:
   a first program sub-code for initializing input and output weight values, respectively, $W_i$ and $V_i$, of a neural network;
   a second program sub-code for instructing a reinforcement agent, comprising said neural network and a critic network, operatively arranged in parallel with the controller, to carry out a stability phase comprising determining a multi-dimensional boundary of neural network weight values for which the system's stability can be maintained; and
   a third program sub-code for instructing said reinforcement agent to carry out a learning phase comprising generating a plurality of updated weight values in connection with the on-line training if and until any one of said updated weight values reaches said boundary, then instructing said reinforcement agent to carry out a next sequence comprising determining a next multi-dimensional boundary of weight values followed by a next learning phase.

18. The program code of claim 17 wherein said first program sub-code further comprises instructions for setting a plurality of table look-up entries of said critic network, to zero; and said third program sub-code further comprises instructions for reading into a memory associated with said neural network, a state variable, s, to produce a control signal output, a, and reading into a memory associated with said critic network, a state and action pair to produce a value function, Q(s, a).

19. The program code of claim 17 wherein said third program sub-code further comprises instructions for exiting any said learning phase for which a total number of said plurality of updated weight values so generated reaches a preselected value.

20. The program code of claim 17 further comprising a fourth program sub-code for instructing said reinforcement agent to carry out a third stability phase and a third learning phase comprising generating a plurality of updated weight values in connection with the on-line training if and until any one of said next updated weight values reaches said next boundary.

* * * * *